(12) United States Patent
Ye et al.

(10) Patent No.: US 7,457,244 B1
(45) Date of Patent: Nov. 25, 2008

(54) SYSTEM AND METHOD FOR GENERATING A TRAFFIC MATRIX IN A NETWORK ENVIRONMENT

(75) Inventors: Feng Ye, Raleigh, NC (US); Kui Zhang, Cupertino, CA (US); Benoit Claise, Crisnée (BE)

(73) Assignee: Cisco Technology, Inc., San Jose, CA (US)

( * ) Notice: Subject to any disclaimer, the term of this patent is extended or adjusted under 35 U.S.C. 154(b) by 761 days.

(21) Appl. No.: 10/877,700

(22) Filed: Jun. 24, 2004

(51) Int. Cl.
*H04L 12/26* (2006.01)
(52) U.S. Cl. ...................... 370/230; 370/235
(58) Field of Classification Search ................. 370/230, 370/235
See application file for complete search history.

(56) References Cited

U.S. PATENT DOCUMENTS

| | | | |
|---|---|---|---|
| 5,088,032 A | 2/1992 | Bosack | 395/200 |
| 5,345,558 A | 9/1994 | Opher et al. | 395/200 |
| 5,359,594 A | 10/1994 | Gould et al. | 370/24 |
| 5,481,738 A | 1/1996 | Bartow et al. | 395/800 |
| 5,511,122 A | 4/1996 | Atkinson | 380/25 |
| 5,519,704 A | 5/1996 | Farinacci et al. | 370/85.13 |
| 5,590,118 A | 12/1996 | Nederlof | 370/218 |
| 5,757,924 A | 5/1998 | Friedman et al. | 380/49 |
| 5,825,772 A | 10/1998 | Dobbins et al. | 370/396 |
| 5,881,243 A | 3/1999 | Zaumen et al. | 395/200.71 |
| 5,926,101 A | 7/1999 | Dasgupta | 340/825.02 |
| 5,937,159 A | 8/1999 | Meyers et al. | 395/187.01 |
| 6,009,092 A | 12/1999 | Basilico | 370/352 |
| 6,055,561 A | 4/2000 | Feldman et al. | 709/200 |
| 6,061,798 A | 5/2000 | Coley et al. | 713/201 |
| 6,069,889 A | 5/2000 | Feldman et al. | 370/351 |
| 6,085,333 A | 7/2000 | DeKoning et al. | 714/7 |
| 6,098,107 A | 8/2000 | Narvaez-Guarnieri et al. | 709/239 |
| 6,108,702 A | 8/2000 | Wood | 709/224 |
| 6,111,884 A | 8/2000 | Ahuja et al. | 370/401 |
| 6,130,889 A | 10/2000 | Feldman et al. | 370/397 |
| 6,131,120 A | 10/2000 | Reid | 709/225 |
| 6,151,324 A | 11/2000 | Belser et al. | 370/397 |
| 6,209,039 B1 | 3/2001 | Albright et al. | 709/249 |
| 6,247,079 B1 | 6/2001 | Papa et al. | 710/103 |
| 6,249,757 B1 | 6/2001 | Cason | 704/214 |
| 6,256,295 B1 | 7/2001 | Callon | 370/254 |
| 6,304,973 B1 | 10/2001 | Williams | 713/201 |
| 6,321,336 B1 | 11/2001 | Applegate et al. | 713/201 |
| 6,347,078 B1 | 2/2002 | Narvaez-Guarnieri et al. | 370/230 |
| 6,385,174 B1 | 5/2002 | Li | 370/252 |
| 6,393,486 B1 | 5/2002 | Pelavin et al. | 709/238 |
| 6,405,248 B1 | 6/2002 | Wood | 709/223 |
| 6,449,279 B1 | 9/2002 | Belser et al. | 370/397 |

(Continued)

OTHER PUBLICATIONS

Y. Rekhter and T. Li, "A Border Gateway Protocol 4 (BGP-4)," RFC 1771, 54 pgs., Mar. 1995.

*Primary Examiner*—Brian D Nguyen
(74) *Attorney, Agent, or Firm*—Baker Botts L.L.P.

(57) ABSTRACT

A method for generating a traffic matrix is provided that includes receiving a first set of data from a first provider edge element and a second set of data from a second provider edge element, the first and second sets of data including border gateway protocol (BGP) next hop information. The first and second sets of data may then be aggregated. Information that is associated with one or more customer network elements is then filtered out in order to produce a traffic matrix.

17 Claims, 3 Drawing Sheets

U.S. PATENT DOCUMENTS

| | | | |
|---|---|---|---|
| 6,452,915 B1 | 9/2002 | Jorgensen | 370/338 |
| 6,483,833 B1 | 11/2002 | Jagannath et al. | 370/392 |
| 6,519,224 B2 | 2/2003 | Hrastar et al. | 370/227 |
| 6,526,052 B1 | 2/2003 | Rijhsinghani et al. | 370/389 |
| 6,535,510 B2 | 3/2003 | Kalkunte et al. | 370/389 |
| 6,550,012 B1 | 4/2003 | Villa et al. | 713/201 |
| 6,578,086 B1 | 6/2003 | Regan et al. | 709/242 |
| 6,584,093 B1 | 6/2003 | Salama et al. | 370/351 |
| 6,625,156 B2 | 9/2003 | Shaio et al. | 370/395.21 |
| 6,639,897 B1 | 10/2003 | Shiomoto et al. | 370/238 |
| 6,657,965 B1 | 12/2003 | Shaffer et al. | 370/238 |
| 6,801,940 B1 * | 10/2004 | Moran et al. | 709/224 |
| 7,058,014 B2 * | 6/2006 | Sim | 370/230 |
| 7,068,598 B1 * | 6/2006 | Bryson et al. | 370/230 |
| 7,212,622 B2 * | 5/2007 | Delaney et al. | 379/221.02 |
| 2003/0152210 A1 * | 8/2003 | Delaney et al. | 379/220.01 |
| 2003/0179705 A1 * | 9/2003 | Kojima | 370/230 |
| 2004/0019686 A1 * | 1/2004 | Toyoda et al. | 709/229 |
| 2005/0007955 A1 * | 1/2005 | Schrodi | 370/230 |
| 2005/0195741 A1 * | 9/2005 | Doshi et al. | 370/230 |

\* cited by examiner

| DAILY PROVIDER EDGE ELEMENT-PROVIDER EDGE ELEMENT TRAFFIC | | | |
|---|---|---|---|
| START: 2003-01T31T00:00:00.001 | | | |
| END: 2003-02-01T00:00:00.000 | | | |
| SOURCE PROVIDER EDGE ELEMENT/DESTINATION PROVIDER EDGE ELEMENT | 1.1.1.1 | 2.2.2.2 | 3.3.3.3 |
| 1.1.1.1 | N/A | 100334/135343 | 150343/200342 |
| 2.2.2.2 | 200234/250343 | N/A | 300344/400343 |
| 3.3.3.3 | 400432/500343 | 250645/350343 | N/A |

SYSTEM AND METHOD FOR GENERATING A TRAFFIC MATRIX IN A NETWORK ENVIRONMENT

TECHNICAL FIELD OF THE INVENTION

This invention relates in general to the field of communications and, more particularly, to a system and method for generating a traffic matrix in a network environment.

BACKGROUND OF THE INVENTION

The field of communications has become increasingly important in today's society. One area of importance associated with network communications relates to network routing. Routing protocols allow one or more components, devices, or modules to correctly direct information to its appropriate next destination. Certain paths or designated routes may be considered optimal or preferred over others.

As traffic and the subscriber base of end users increases, so too does the importance of efficient management of communication sessions and data flows. In order to assist in this endeavor, service providers generally utilize a tool known as a traffic matrix. The traffic matrix offers a summary of traffic volume between any two or more selected network elements. Traffic volume can provide some idea to service providers about capacity considerations between network elements, packet loss characteristics in the network, or other network aspects to be considered. The traffic matrix can offer a valuable tool for service providers to allocate their resources in an optimal fashion.

Existing methodologies and strategies to create a traffic matrix suffer from a number of shortcomings. For example, architectures simply take too long to deduce the traffic matrix for a given service provider. Moreover, many operations that produce a traffic matrix require intensive and complex calculations. Further, existing traffic matrix solutions consume excessive resources in executing their assigned operations. Thus, the ability to quickly and accurately create a suitable traffic matrix in a network environment provides a significant challenge to network operators, service providers, and system designers.

SUMMARY OF THE INVENTION

From the foregoing, it may be appreciated by those skilled in the art that a need has arisen for an improved traffic matrix generation approach in a network environment. In accordance with one embodiment of the present invention, a system and a method for producing an accurate traffic matrix in a network environment are provided that substantially eliminate or greatly reduce disadvantages and problems associated with conventional traffic matrix techniques.

According to one embodiment of the present invention, there is provided a method for generating a traffic matrix that includes receiving a first set of data from a first provider edge element and a second set of data from a second provider edge element, the first and second sets of data including border gateway protocol (BGP) next hop information. The first and second sets of data may then be aggregated. Information that is associated with one or more customer network elements is then filtered out in order to produce a traffic matrix.

Certain embodiments of the present invention may provide a number of technical advantages. For example, according to one embodiment of the present invention, a traffic matrix is provided that is more accurate. This is a result of using a new export protocol, in conjunction with simple filtering techniques. Such filtering stands in contrast to other approaches that are not as accurate and that consume a greater number of resources.

Another technical advantage associated with one embodiment of the present invention is a result of the architecture of the communication system. The simplification of the traffic matrix results in quicker results for the traffic matrix. In addition, such an approach is generally cheaper because only a single key (i.e. BGP next hop data) is considered in creating the traffic matrix. This is different than other systems that may use multiple keys in making more complex calculations. Additionally, such a configuration is readily scalable. Moreover, such an approach can be leveraged with an existing communications protocol (e.g. BGP). This allows existing systems to readily implement such an approach without having to be changed or altered significantly. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2 is a simplified example table that illustrates sample traffic matrix data.

DETAILED DESCRIPTION OF EXAMPLE EMBODIMENTS OF THE INVENTION

Figure 1:
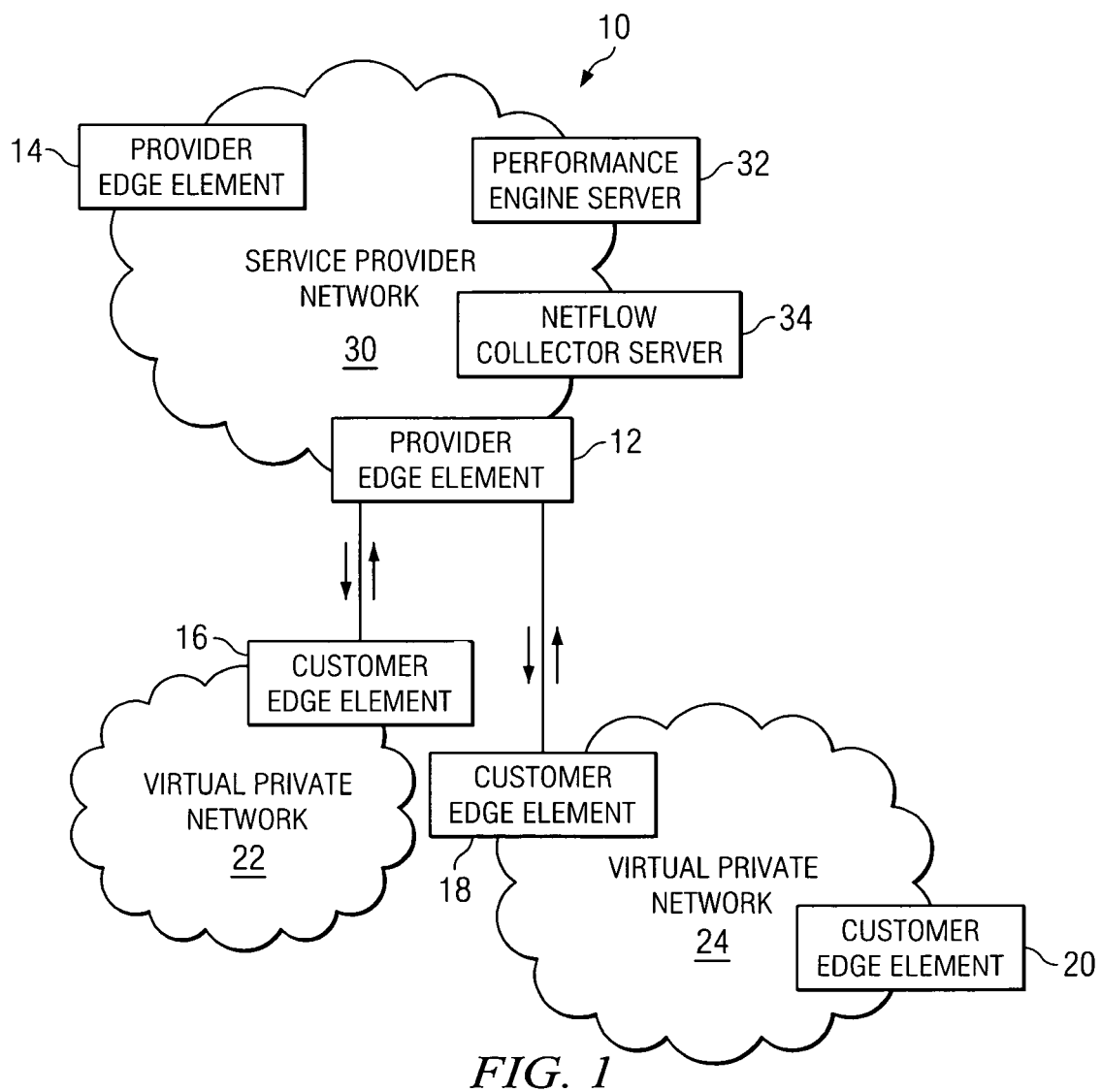
FIG. 1 is a simplified block diagram of a communication system for generating a traffic matrix in a network environment.

FIG. 1 is a simplified block diagram of a communication system 10 for producing a traffic matrix in a network environment in accordance with one embodiment of the present invention. Communication system 10 may include a set of provider edge elements 12 and 14, and a set of customer edge elements 16, 18, and 20. Communication system 10 may also include a set of virtual private networks (VPNs) 22 and 24, and a service provider network 30. Positioned on the edge of service provider network 30 (or provided in any other suitable location based on particular networking needs) are a performance engine server 32 and a netflow collector server 34 (or a set of netflow collector servers 34 strategically positioned in the network). Communication system 10 may readily accommodate a single netflow collector server 34 architecture or be provided (most likely because of scalability issues) with multiple netflow collector servers 34 based on particular networking needs.

Communication system 10 may be positioned in any suitable network environment or communications architecture that operates to manage or otherwise direct information using any appropriate border gateway protocol (BGP). Note that the term BGP is inclusive of internal BGP (IBGP) and exterior BGP (EBGP) as used herein in this document.

In accordance with the teachings of the present invention, communication system 10 makes use of a new Netflow data export (e.g. BGP next hop) in order to generate an accurate traffic matrix. Communication system 10 may make use of Netflow data export in order to avoid highly resource intensive steps (which generally require far more data and more processing) in producing a provider edge element to provider edge element traffic matrix.

In order to understand the extent of the teachings of communication system 10, it is useful to offer some overview as to the way in which traffic matrices are generally created and used. This description is offered for purposes of teaching only and should not be construed in any way to limit the principles, characteristics, and features of the present invention.

A multiprotocol label switching (MPLS)-based provider network can provide VPN service to multiple customer sites. Service provider network 30 may consist of core elements (e.g. routers) and provider edge elements (e.g. provider edge elements 12 and 14). In addition, each VPN network 22 and 24 may be connected to a given provider edge element via a customer edge element. For typical VPN packets between two VPN networks across service provider network 30, the access/ingress provider edge element imposes MPLS labels (e.g. top label and VPN label) to these packets and forwards them toward the exit/egress point. The egress provider edge element may then strip off the labels and relay them to the proper customer edge element as indicated by the VPN label.

BGP is enabled on the provider edge elements in order to provide such VPN services. Typically, for the ingress provider edge element, the BGP next hop is the egress provider edge element. There may be two exceptions to this concept. First, a VPN has two sites that connect to the same provider edge element. For traffic between these two sites, the BGP next hop will be the destination customer edge element instead. Second (in theory), a VPN service can be provided jointly by multiple providers, whereby the BGP next hop is then the border element (e.g. a router) between networks of different providers.

Communication system 10 may behave as follows in one example scenario. A 'netflow protocol' (at the time of the filing of this patent application an IETF article/draft has been submitted for the Netflow Data protocol (version IX)) will be enabled on customer edge element-facing interfaces of provider edge elements 12 and 14. Provider edge elements 12 and 14 can export BGP next hop in Netflow Data Export (NDE) flow records. Multiple netflow collector servers 34 may be used to collect all NDE packets from provider edge elements 12 and 14. Netflow collector servers 34 may perform aggregation based on a unique combination of keys, including BGP next hop. Performance engine server 32 may then collect and process these results from netflow collector servers 34 in order to filter out the records with a non-provider edge element BGP next hop. Performance engine server 32 may then conduct further time-based aggregation (as needed) and then generate provider edge element to provider edge element traffic reports.

Note that in certain existing methodologies cases, customer edge elements are counted in making BGP next hop calculations. This operates to skew the true next hop value offered. Communication system 10 operates to avoid this dilemma by providing a filtering mechanism in performance engine server 32. This accurate BGP next hop value that is determined by performance engine server 32 may be used to provide a traffic matrix that offers a clear picture to a service provider of how the network is behaving. This, in turn, could allow the provider to better allocate his resources, to address potential 'hot spots' in the network, or to alleviate congestion problems being caused by too much traffic propagating through a given network location. Thus, as is readily evident, the traffic matrix provides a powerful tool for traffic management operations. Other applications could include any number of uses for an accurate traffic matrix being employed to predict future traffic patterns.

The traffic matrix produced by communication system 10 offers a map of traffic volume and other network characteristics that is accurate and easily created. This is a result of using the (current) netflow data export protocol, in conjunction with simple filtering operations. Such filtering stands in contrast to other approaches that consume a greater number of resources. In addition, such an approach is generally cheaper because only a single key (i.e. next hop data) is considered in creating the traffic matrix. This is different than other systems that may use multiple keys in making more complex calculations.

Moreover, communication system 10 provides a faster method to produce the traffic matrix and offers an approach that is readily scalable. In addition, such an approach can be leveraged with an existing communications protocol (e.g. BGP) without affecting existing flows. This feature allows existing systems to be upgraded (e.g. via appropriate software) in order to implement such an approach.

In an example embodiment, communication system 10 operates in conjunction with a suitable gateway routing protocol (e.g. BGP). In order to explain some of the features of communication system 10, it is appropriate that an overview of BGP be provided. It is critical to note that such a discussion has been offered for purposes of example and teaching only and, therefore, should not be construed in any way to limit the broad scope or various potential applications of communication system 10. By way of example, BGP is described with reference to a group of edge routers.

BGP, generally defined in RFC 1771, allows a user or a system designer to create loop-free interdomain routing between autonomous systems. Routers in an autonomous system can use multiple interior gateway protocols to exchange routing information inside the autonomous system and an exterior gateway protocol to route packets outside the autonomous system. BGP may use transmission control protocol (TCP) as its transport protocol (e.g. port 179). Two BGP routers may form a TCP connection between one another (peer routers) and exchange messages to open and confirm the connection parameters. BGP routers may exchange network reachability information. This information is mainly an indication of the full paths (BGP autonomous system numbers) that a route should take in order to reach the destination network. This information helps in constructing a graph of autonomous systems that are loop-free and where routing policies can be applied in order to enforce some restrictions on the routing behavior.

Any two routers that have formed a TCP connection in order to exchange BGP routing information are called peers or neighbors. BGP peers initially exchange their full BGP routing tables. After this exchange, incremental updates are sent as the routing table changes. BGP keeps a version number of the BGP table, which should be the same for all of its BGP peers. The version number may change whenever BGP updates the table due to routing information changes. Keepalive packets may be sent to ensure that the connection is alive between the BGP peers and notification packets may be sent in response to errors or special conditions.

It is necessary to ensure reachability for networks within an autonomous system before sending the information to external autonomous systems. This is done by a combination of internal BGP peering between routers inside an autonomous system and by redistributing BGP information to internal gateway protocols (IGPs) running in the autonomous system. When BGP is running between routers belonging to two different autonomous systems, the protocol used may be referred to as an exterior BGP (EBGP). When BGP is running between routers in the same autonomous system it may be referred to as an IBGP.

Once the TCP connection is up between two autonomous systems, the routers send open messages in order to exchange values such as the autonomous system number, the BGP version they are running, the BGP router ID, and the keepalive hold time. After these values are confirmed and accepted, the neighbor connection is established. Any state other than "established" is an indication that the two routers did not become neighbors and BGP updates will not be exchanged.

After BGP receives updates about different destinations from different autonomous systems, the protocol may decide which paths to choose in order to reach a specific destination. BGP may choose only a single path to reach a specific destination. The decision process may be based on different attributes such as next hop, administrative weights, local preference, the route origin, path length, origin code, metric, etc. BGP may then propagate the best path to its neighbors. Communication system 10 leverages BGP in order to produce an accurate traffic matrix that consumes minimal resources.

Provider edge elements 12 and 14, and customer edge elements 16, 18, and 20 are a group of routers (potentially edge routers) in accordance with one example embodiment, but may alternatively be a switch, a gateway, a processor, a loadbalancer, or any other suitable component, device, element, or object operable to exchange information or data. The routers included in a given network may be under a common administrative control (e.g. Cisco, SprintLink, etc.). Additionally, each of provider edge elements 12 and 14, and customer edge elements 16, 18, and 20 may include any suitable hardware, processors, modules, algorithms, software, components, or elements operable to execute one or more of the operations thereof or to provide some communication or processing capability for communication system 10.

In a particular embodiment of the present invention, one or more of provider edge elements 12 and 14, and customer edge elements 16, 18, and 20 execute BGP and include a capability to perform two-way connectivity, graph building, and path confirmation operations as described herein. Such capabilities may be implemented via a modification or addition in code or via a software implementation in cooperation with BGP to accommodate such operations. Alternatively, provider edge elements 12 and 14, and customer edge elements 16, 18, and 20 may accommodate this verification approach via any other suitable manner with the potential use of any appropriate algorithms, hardware, software, modules, components, or elements operable to execute these tasks.

In operation of an example embodiment of communication system 10, provider edge elements 12 and 14 provide an access point for customer edge elements 16 and 18 such that data can be forwarded in an appropriate manner. Note that provider edge element 12 may be responsible for both ingress and egress data in this simplified diagram. Other edge elements may provide similar operations. However, in other scenarios ingress and egress data may be treated separately by two network elements. Considerable flexibility is provided by the architecture of communication system 10, as it may be rearranged or reconfigured in any number of appropriate ways.

Customer edge elements 16, 18, and 20 may interface with provider edge elements 12 and 14 and, furthermore, terminate customer traffic. For example, an e-mail could be generated by a person in VPN 22 (e.g. in San Jose, Calif.) and be sent to a person in VPN 24 (e.g. in Raleigh, N.C.). Such traffic could start at customer edge element 18 and be received at provider edge element 12 (an ingress element) at service provider network 30. From there, the traffic may leave provider edge element 12 (or another separate egress element) and be forwarded to customer edge element 16. Reverse traffic could be handled in a similar fashion.

Performance engineer server 32 is a network management application running on a server that includes software for executing its assigned tasks in an example embodiment. Alternatively, such a function may be provided by hardware (or any combination thereof) or by any other algorithm, application specific integrated circuit (ASIC), device, component, element, or object operable to achieve such operations. Similarly, netflow collector server 34 is an application running on a server that includes software for executing its assigned tasks in an example embodiment. In the alternative, such a function may be provided by hardware (or any combination thereof) or by any other algorithm, ASIC, device, component, element, or object operable to achieve such operations. Netflow collector server 34 could be co-located with provider edge elements 12 and 14 (i.e. in the same network) or be provided in any other suitable location. Deployment of netflow collector server 34 could be based on particular networking needs or specific arrangements and configurations. Provider edge elements export netflow data exports containing BGP next hop fields to netflow collector server 34.

In the context of scalability and in an example that involves thirty provider edge elements, approximately five or six netflow collector servers 34 may be needed to adequately service these devices. In addition, a single performance engine server 32 may interface with these netflow collector servers 34. These estimates are based on general traffic conditions, whereby heavier traffic areas may require additional netflow collector servers 34 or performance engine servers 32 to be placed at the edge of the corresponding network.

In operation of an example embodiment, netflow collector server 34 may aggregate netflow data with BGP next hop as a key (e.g. having packet and byte counts as values). Performance engine server 32 may upload netflow collector server 34 data files and perform (e.g. hourly or daily) aggregation, and processing operations in filtering out non-provider edge element entries Netflow collector servers 34 operate to collect and aggregate data from selected provider edge elements. The aggregation is a summation of flows having the same combination of keys to form one record. The key is a piece of data in the netflow data export. The key in this particular example relates to a BGP next hop value. Thus, all the flows sharing the same BGP next hop will be aggregated into one record. Performance engine server 32 has connectivity to all netflow collector servers 34. Hence, performance engine server 32 collects all of the results from all of the netflow collector servers 34 for all of the participating provider edge elements. Note that in our previous example (involving thirty provider edge elements and six netflow collector servers), a single performance engine server 32 to service all six netflow collector servers 34. Note that in alternative configurations, performance engine server 32 and netflow collector server 34 may be combined together into one single network device. For example, netflow collector server 34 and performance engine server 32 can reside in one server host machine (such as those offered by Solaris or Linux Operating Systems), provided that the resources on such a machine support this kind of deployment.

Service provider network 30 and VPNs 22 and 24 each represents a series of points or nodes of interconnected communication paths for receiving and transmitting packets of information that propagate through communication system 10. Service provider network 30 offers a communicative interface between VPN 22 and VPN 24. Service provider network 30 may be owned and operated by companies such AT&T and offer service for any given VPN. Alternatively, service provider network 30 may be any local area network (LAN), wireless local area network (WLAN), metropolitan area network (MAN), wide area network (WAN), VPN, or any other appropriate architecture or system that facilitates communications in a network environment. Service provider network 30 may implement any suitable communication protocol for transmitting and receiving data or information within communication system 10.

FIG. 2 is a simplified table 50 that offers a sample traffic report generated using communication system 10. The report includes a header and a data matrix. The first three rows represent headers; they specify the report frequency and type, and also contain start/end time stamps. Each data row reflects traffic from a certain provider edge element whose IP address is displayed in the first cell of the row. Each data column reports traffic to a certain destination provider edge element. The numbers displayed in the cells represent packet count and K-byte count, which are separated with a slash. For example, the 400432/500343 pair in the bottom row shows that there are 400432 packets containing 500343 K-bytes routed from provider edge element 3.3.3.3 to provider edge element 1.1.1.1, on Jan. 31, 2003. N/A stands for not applicable. The report time level shows the frequency of the traffic reports. Any frequency may be readily supported (e.g. hourly and daily). Reports may be kept for a configurable length of time.

Figure 3:
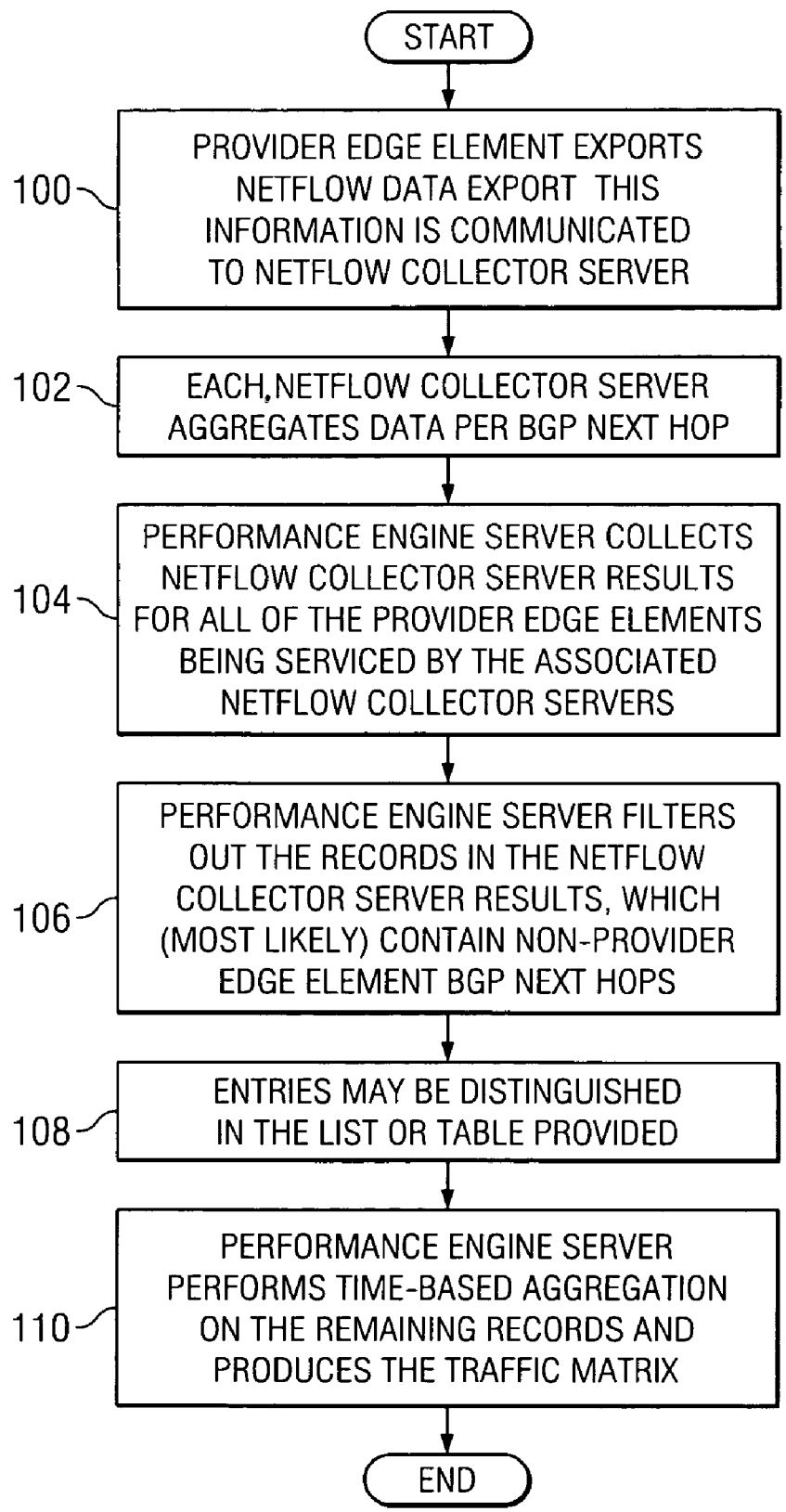
FIG. 3 is a flowchart illustrating a series of example steps associated with a method for generating a traffic matrix in a network environment.

FIG. 3 is a simplified flowchart illustrating a series of example steps associated with a method for generating a traffic matrix in a network environment. The method may begin at step 100 where provider edge element 12 exports netflow data export (Version IX) data, including BGP next hop. This information is to be received by netflow collector server 34. At step 102, each netflow collector server 34 aggregates data per BGP next hop, instead of per any other key combination. Performance engine server 32 collects netflow collector server 34 results, at step 104, for all of the provider edge elements being serviced by the associated netflow collector servers 34.

At step 106, performance engine server 32 filters out the records in the netflow collector server results, which (most likely) contain non-provider edge element BGP next hops. For example, these could include customer edge elements 18 and 20 that could skew the traffic matrix. This requires that a list of all provider edge elements to be configured accordingly. The remaining records are for traffic between the exporting device (ingress provider edge elements) and the BGP next hops (egress provider edge elements).

Because the non-provider edge element entries are going to be filtered, a list is used to distinguish which elements are provider edge elements or customer elements. Performance engine server 32 may be used to include such a list in this example embodiment. In other scenarios, the list may be included in any other appropriate location or provided external to performance engineer server 32. Thus, entries may be distinguished in the list or a table provided at step 108. Performance engine server 32 may then perform time-based aggregation on the remaining records and produces the traffic matrix at step 110.

Some of the steps illustrated in FIG. 3 may be changed or deleted where appropriate and additional steps may also be added to the flowchart. These changes may be based on specific system architectures or particular communication arrangements or configurations and do not depart from the scope or the teachings of the present invention.

It is also important to note that communication system 10 may be implemented in accordance with a number of routing protocols. The embodiments described with reference to FIGS. 1 and 3 and to the BGP standard have been offered for purposes of example only. Communication system 10 may be implemented with any other appropriate routing protocol in accordance with particular needs. Other protocols between provider edge elements and customer edge elements may be readily implemented without departing from the scope of the present invention and include (but are not limited to) any generic border gateway protocol (BGP), express forwarding (EF), open shortest path first (OSPF) protocol, intermediate system-to-intermediate system (IS-IS) protocol, or any other suitable forwarding or routing protocol deemed appropriate.

Although the present invention has been described in detail with reference to particular embodiments, it should be understood that various other changes, substitutions, and alterations may be made hereto without departing from the spirit and scope of the present invention. For example, although the present invention has been described with reference to a particular configuration of service provider network 30, any one or more of these elements may be provided external to service provider network 30 as its own separate component, element, or object. Additionally, although communication system 10 has been described as applying to traffic volume, the teachings of communication system 10 may be applied to any traffic matrix implementation procedure or configuration. Other scenarios may include any architecture that receives data and seeks to generate a traffic matrix based on the information being offered.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for generating a traffic matrix, comprising:
a set of netflow collector servers operable to:
    receive a first set of data from a first provider edge element and a second set of data from a second provider edge element, the first and second sets of data including border gateway protocol (BGP) next hop information,
    aggregate the first and second sets of data into a plurality of records according to the BGP next hop information,
    filter out from the records information that is associated with one or more customer network elements such that a traffic matrix is produced that does not include the customer network elements, and
    generate the traffic matrix from the records.

2. The apparatus of claim 1, wherein a selected one of the netflow collector servers and a performance engine server are included in a single network device.

3. The apparatus of claim 1, wherein a performance engine server includes a table that stores information about the first and second provider edge elements such that the first and second provider edge elements can be distinguished from the one or more customer network elements and non-provider edge elements.

4. The apparatus of claim 1, wherein the traffic matrix is produced with a frequency associated with a selected one of hourly and daily.

5. The apparatus of claim 1, wherein the first and second provider edge elements are a selected one of a group of elements consisting of:
   (a) a router;
   (b) a switch;
   (c) a gateway;
   (d) a loadbalancer; and
   (e) a processor.

6. The apparatus of claim 1, wherein the first and second provider edge elements are edge routers that are running netflow data export version nine.

7. The apparatus of claim 1, the set of netflow collector servers further operable to aggregate the first and second sets of data into the plurality of records according to the BGP next hop information by:
   aggregating the data of a flow sharing the same BGP next hop information in a record.

8. A method for generating a traffic matrix, comprising:
   receiving a first set of data from a first provider edge element and a second set of data from a second provider edge element, the first and second sets of data including border gateway protocol (BGP) next hop information;
   aggregating the first and second sets of data into a plurality of records according to the BGP next hop information;
   filtering out from the records information that is associated with one or more customer network elements in order to produce a traffic matrix that does not include the customer network elements; and
   generating the traffic matrix from the records.

9. The method of claim 8, further comprising:
   storing a table that stores information about the first and second provider edge elements such that the first and second provider edge elements can be distinguished from the one or more customer network elements.

10. The method of claim 8, wherein the traffic matrix is produced with a frequency associated with a selected one of hourly and daily.

11. The method of claim 8, wherein the first and second provider edge elements are edge routers that are running netflow data export version nine.

12. The method of claim 8, the aggregating the first and second sets of data into the plurality of records according to the BGP next hop information further comprising:
   aggregating the data of a flow sharing the same BGP next hop information in a record.

13. A system for generating a traffic matrix, comprising:
   means for receiving a first set of data from a first provider edge element and a second set of data from a second provider edge element, the first and second sets of data including border gateway protocol (BGP) next hop information;
   means for aggregating the first and second sets of data into a plurality of records according to the BGP next hop information;
   means for filtering out from the records information that is associated with one or more customer network elements in order to produce a traffic matrix that does not include the customer network elements; and
   generating the traffic matrix from the records.

14. The system of claim 13, further comprising:
   means for storing a table that stores information about the first and second provider edge elements such that the first and second provider edge elements can be distinguished from the one or more customer network elements.

15. The system of claim 13, wherein the traffic matrix is produced with a frequency associated with a selected one of hourly and daily.

16. The system of claim 13, wherein the first and second provider edge elements are edge routers that are running netflow data export version nine.

17. The system of claim 13, the means for aggregating the first and second sets operable to aggregate the data of a flow sharing the same BGP next hop information in a record.

* * * * *